United States Patent Office 2,764,596
Patented Sept. 25, 1956

2,764,596
INORGANIC ACID ESTERS OF POLYHYDROXYLATED FLAVONES AND FLAVANONES

Souren Avakian, Oreland, Jay Morton Beiler, Whitemarsh, and Gustav J. Martin, Philadelphia, Pa., assignors to The National Drug Company, Philadelphia, Pa., a corporation of Delaware No Drawing. Application July 1, 1952,
Serial No. 296,713

4 Claims. (Cl. 260—345.2)

This invention relates to the preparation of certain organic compounds, and more particularly to novel acylated derivatives of flavones and flavanones. Such compounds are particularly useful as intermediates in various chemical syntheses and as surface active ingredients, for example, as detergents somewhat paralleling in their function chemicals like sodium lauryl sulfate.

Broadly speaking, the novel products of this invention are inorganic acid esters of polyhydroxylated heterocyclic compounds selected from the group consisting of flavones and flavanones. They are prepared by esterifying the desired flavone or flavanone with an inorganic acid. The term "flavones" is herein used generically to describe polyhydroxy derivatives of both flavone and its isomeric form, isoflavone. Flavone itself and isoflavone itself have respectively the formulae

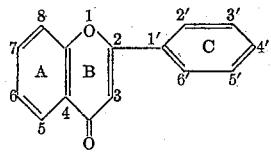

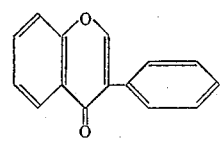

Similarly, the term "flavanones" includes polyhydroxy derivatives of both flavanone and isoflavanone per se. The parent compound, flavanone itself, is a 2,3-dihydroflavone, i. e. it has the formula

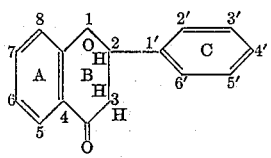

Isoflavanone itself is 2,3-dihydro-isoflavone, with the formula

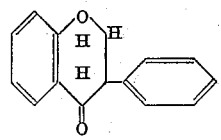

In the flavones and flavanones derived from such compounds, the hydroxyl substituents may be present at many different positions on the above structures, in the A, B, and/or C rings. In addition to two or more hydroxyl groups, the molecules may contain other substituents, e. g. alkoxy groups or other aliphatic side chains. These should not markedly hinder the novel reactions of this invention; however it is believed that their presence, character and position in the molecule, may sometimes affect the extent and ease of esterification of some of the nuclear hydroxyl groups.

It has been discovered that these various polyhydroxylated flavones and flavanones may be reacted with inorganic acids in inert liquid media, particularly in inert organic solvents, to obtain inorganic acid ester groups at one or more of the hydroxyl functions. For instance, an inorganic phosphorus-containing acid may be reacted with the desired polyhydroxylated compound to produce a phosphorylated flavone or flavanone. Similarly, the polyhydroxylated reactant may be esterified with an inorganic sulfur-containing acid to yield the corresponding sulfated product, an ester of the acid reagent and the flavone or flavanone. Inorganic nitrating agents, halogenating agents and the like may alternatively be employed to acylate the heterocyclic compounds and obtain the new esters.

According to one specific embodiment of this invention, derivatives of polyhydroxylated flavones are prepared having the general formula

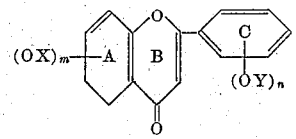

(for the corresponding isoflavone derivatives, the C ring is merely attached to B through the carbon at position 3 instead of 2). In this formula $m$ may be zero or an integer up to 4, $n$ may be zero or an integer from 1 to 5, and the sum of $(m+n)$ must be at least 2. Preferably, $m$ is from 0 to 2, and $n$ is from 0 to 2, $(m+n)$ then being 0 to 4. X and Y designate substituents selected from the group consisting of hydrogen and inorganic acid anions, at least one of these substituents being, of course, an inorganic acid anion. Thus, before esterification there may be two or three or four hydroxyl groups on the A ring and one on the C ring, or there may be from two to five OH substituents on C and none on A. However, most useful products are obtained by esterifying compounds wherein $m$ is an integer from 1 to 4 and $n$ is an integer from 1 to 5. A dihydroxylated flavone may be esterified completely, in which case both X and Y above will be inorganic acid anions; or it may be esterified only partially, in which case one of the two groups will be the acid anion and the other will remain hydrogen. The same is true for tri-, tetra-, penta- and the like hydroxylated flavones. As examples of new esters of this type may be mentioned phosphorylated chrysin, phosphorylated quercetin, phosphorylated myricetin, the corresponding sulfated compounds and the like.

According to a second embodiment of this invention, another preferred group of new products is derivatives of polyhydroxylated flavanones having the general formula

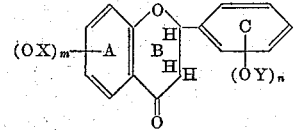

(or, of course, the isomers of such compounds, i. e. where the C ring is attached to the B ring at position 3). The same considerations apply here as above discussed in connection with the flavone derivatives, as to the character and value of $m$, $n$, X and Y. As examples of this type of esters may be mentioned those of inorganic sulfur-containing acids with naringenin, eriodictyol or hesperitin (the last containing a methoxy substituent at position 4', as well as the usual hydroxyl groups), the corresponding phosphorus-containing compounds, etc.

As previously mentioned, the process whereby these new compounds are obtained comprises reacting the initial polyhydroxylated flavones or flavanones with inorganic acids in inert liquid systems. The system is preferably anhydrous, at least during esterification, and organic solvents are preferred. An organic medium which will at least partially dissolve the reactants and yet not itself enter into disadvantageous side reactions, is best used. Pyridine and dimethyl aniline have been employed with particular success. Generally, the most useful solvents are nitrogenous organic bases like these and formamide, dimethyl formamide, diethyl amine, triethyl amine, quinoline, mixtures of these, etc. No fixed proportion of solvent in relation to the reactants is critical. In fact, it is not necessary to dissolve the reactants completely, but suspensions thereof in inert liquids may be utilized. It is important for maximum yield and reaction efficiency that the system be thoroughly agitated during the reaction, if complete solution of the reactants is not achieved, so that intimate mixture of the constituents is realized.

The inorganic acid reactant may be selected from a wide variety of substances, depending upon the type of ester product desired. Similarly, the quantity of the acid in relation to a given polyhydroxylated flavone or flavanone will govern in large measure the degree of esterification of the latter, i. e. whether all or a certain part of the available hydroxyl groups are attacked. Thus, one gram-atom of phosphorus or sulphur per grammolecule of a trihydroxy flavone or flavanone will generally produce a dihydroxylated, mono-ester compound. The presence and position of other substituents on the heterocyclic reactant may also affect reaction of some of the hydroxyl groups, as previously indicated, and an excess of the acid reactant may be advisable. Useful acylating agents are anhydrous or at least relatively low in water content. Especially valuable and preferred inorganic acids are those which contain oxygen and either sulfur or phosphorus, e. g. concentrated sulfuric acid, phosphorus oxychloride and chlorophosphoric acid. Satisfactory results have also been achieved using phosphoric acid, sulfurous acid and the like.

The temperature of reaction is generally effective in accelerating or reducing the speed of esterification, and often seems also to influence the number, and perhaps the position, of the acid groups introduced. Temperatures from about 0° to about 100° C. have been employed, and simple room temperature conditions or slight heat, say 15° C. to 40° C., are usually preferable. It is obvious that the temperature chosen must be interdependent with the particular solvent, the inorganic acid reactant, and the character of the polyhydroxy flavone or flavanone to be esterified.

The new products are best recovered from the reaction medium by taking advantage of the different solubilities of the esters or their salts in various organic and aqueous media. One especially satisfactory method, thus, is to quench the reaction mass in water at a low temperature, for instance in ice, filter it and treat the filtrate with an organic precipitant for the ester, such as acetone, a lower aliphatic alcohol like methanol, ethanol, iso- or n-propanol, or an aliphatic ether (especially short-chain) or ethyl acetate or mixtures thereof or the like. The supernatant organic liquid can then be decanted and the residue of acylated flavones and/or flavanones recovered.

Such products may be quite crude or relatively pure, depending upon the character of the initial reactants and the operating conditions. They may be used directly as intermediates in synthesizing other chemical compounds or as surface-active agents, or they may be further purified by additional washing, re-solution and reprecipitation. Procedures which are well known in the field may be employed in this connection. A particularly useful technique is to wash the crude products with acetone or ether or a similar non-solvent therefor, dissolve them in water and reprecipitate with ethyl acetate or an alcohol or one of the other precipitants above listed. If desired, the aqueous solution may be neutralized with a base before precipitation, so that a salt of the ester results.

The esters are obtained as solids, normally yellowish to red or brown crystals. The solubility characteristics of the new products are especially noteworthy, in that they are generally soluble in water and insoluble in the common organic solvents (depending, of course, on the character of the particular acid anions introduced in the flavone or flavanone molecule). The free esters tend to be somewhat soluble in the lower alcohols, while the salts are not (although sodium salts are slightly soluble also). Solubility is greatest with methanol, less with ethanol, still less with isopropanol, i. e. it seems to decrease with increasing length of the aliphatic alcohol chain. Furthermore and quite unusual, as the number of ester groups introduced in the heterocyclic molecule increases, the alcohol-solubility of the free acid form increases but the solubility of the sodium salts decreases.

The following examples are given by way of illustration and are not to be considered as limitations of the invention. Indeed, as many apparently widely different embodiments of the invention may be made without departing from the spirit and scope hereof, it is to be understood that this invention is not limited except as defined in the appended claims.

*Example I*

One mole of hesperitin was dissolved at room temperature in predistilled pyridine and the vessel containing the solution was placed in an ice bath. Four moles of $POCl_3$ were added dropwise to the solution, with constant stirring, at such a rate that the temperature was maintained at between 20° and 30° C. This addition took about 75 minutes. When all of the inorganic oxygenated phosphorus acid had been added, the mixture was stirred for ½ hour at room temperature. It was then drowned in ice, thorough agitation being continued while the temperature was held below 40° C. A diatomaceous earth filteraid was added and the mass filtered. The aqueous filtrate was mixed with vigorous stirring in four times its volume of isopropyl alcohol and allowed to stand for one hour to settle the precipitate which formed. The supernatant liquor was then decanted and the residue dissolved in water. Saturated sodium hydroxide solution was added to this solution to a pH of 7.5, and the neutralized material was mixed with stirring with additional isopropyl alcohol. A reddish-yellow solid precipitated, which was filtered off, washed well with acetone and dried under vacuum. This product was analyzed and found to contain 14% by weight of phosphorus, showing that two of the three hydroxyl groups of the initial hesperitin reactant had been acylated by the $POCl_3$.

The same procedure was repeated, using concentrated sulfuric acid in place of the $POCl_3$, and a novel ester of hesperitin with the sulfur-containing acid was recovered.

*Example II*

One mole of hesperitin was dissolved in pyridine and added dropwise with stirring to a solution of five moles of $POCl_3$, also dissolved in pyridine. The reaction temperature was kept at 0–5° C. during the addition, and the mixture was then stirred for one hour at 20–25° C. After this, the mass was added to ice and the resulting aqueous solution was filtered and drowned with a 1:1 mix of ethyl ether and ethanol. An oil separated and was washed with ethyl alcohol, dissolved in water, and the aqueous solution added to methyl alcohol. A phosphorus ester of hesperitin precipitated, which was shown by analysis to have all three of its available hydroxyl groups esterified. Theoretical phosphorus content 16.78%; phosphorus content found 16.45%.

The same procedure was repeated, employing eriodictyol in place of the hesperitin, and the equivalent tetraphosphorus ester of this flavanone was obtained.

Example III

Pyridine was cooled to 10° C. on an ice bath and to it were added with stirring five moles of $POCl_3$, keeping the temperature below 20° C. A solution of one mole of quercetin in pyridine was added to this in a steady stream over a half-hour period with stirring, while keeping the temperature at 20°–30° C. The reaction mixture was stirred at room temperature for one hour and then drowned in ice, holding the temperature below 20° C. The material was filtered with the help of a diatomaceous earth filteraid and vacuum, and the filtrate was gently stirred into isopropyl alcohol. After settling for one hour, the supernatant liquor was decanted and the residue dissolved in water. This aqueous solution was neutralized with sodium hydroxide to pH 7, while the temperature was kept below 30–35° C. Mixing the solution with additional isopropyl alcohol afforded a precipitate of a reddish-orange solid, which was washed with acetone, filtered and dried under vacuum. It was then redissolved in water and reprecipitated with ethanol to yield a light yellow product, a phosphorus ester of quercetin. Analysis of this material showed that three of the five hydroxy substituents of the original quercetin had reacted with the inorganic acid. Theoretical phosphorus content 15.3%; phosphorus content found 14.4%.

The above method was repeated, using concentrated sulfuric acid in place of the $POCl_3$, to obtain a novel sulfur ester of quercetin.

The above process was again repeated, using morin in place of quercetin. A morin ester containing three phosphorus atoms per molecule was recovered.

What is claimed is:
1. Esters of (1) polyhydroxylated heterocyclic compounds selected from the group consisting of flavones and flavanones and (2) inorganic acids of the group consisting of phosphoric and sulfuric acids.
2. Surfuric acid esters of quercetin.
3. Phosphoric acid esters of eriodictyol.
4. Phosphoric acid esters of hesperitin.

References Cited in the file of this patent
UNITED STATES PATENTS

| 2,465,320 | Bergel et al. | Mar. 22, 1949 |
| 2,583,744 | Schrader | Jan. 29, 1952 |

FOREIGN PATENTS

| 887,051 | France | Nov. 3, 1943 |

OTHER REFERENCES

Watson et al.: J. Chem. Soc. 105, pp. 389–99 (1914).
Ozawa: Chem. Abst., vol. 46, p. 6124 (1952), citing J. Pharm. Soc. Japan, vol. 71, pp. 1173–8 (1951).
Karrer: Org. Chem., pp. 109–110, Elsevier Pub. Co., N. Y., 1947.
Perkin: J. Chem. Soc. 67, 647–50 (1895).
Perkin: J. Chem. Soc. 69, 206; 1439–47 (1896).
Chem. Abst., vol. 37, p. 27264 (1943).
Dye Chem. by Georgievics et al., p. 304 (2nd ed.), Scott, Greenwood and Son, London, 1920 (TP910G38).
Colour Index 1924, Suppl. 1928, Sec. B, pp. 292–94 (TP910S6).
"Heterocyclic Compounds," Elderfield, vol. 2, p. 268 (1951), John Wiley and Sons Inc., N. Y. (QD400E4).